United States Patent
Pannell

(10) Patent No.: US 8,139,600 B1
(45) Date of Patent: *Mar. 20, 2012

(54) QUALITY OF SERVICE HALF-DUPLEX MEDIA ACCESS CONTROLLER

(75) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 900 days.

This patent is subject to a terminal disclaimer.

(21) Appl. No.: 11/893,104

(22) Filed: Aug. 14, 2007

Related U.S. Application Data

(63) Continuation of application No. 10/054,595, filed on Jan. 22, 2002, now Pat. No. 7,257,125.

(51) Int. Cl.
H04L 12/413 (2006.01)
H04L 12/26 (2006.01)
H04J 3/02 (2006.01)

(52) U.S. Cl. .......................... 370/445; 370/230; 370/462

(58) Field of Classification Search .................. 370/282, 370/293, 296, 445, 462, 496
See application file for complete search history.

(56) References Cited

U.S. PATENT DOCUMENTS

| | | | |
|---|---|---|---|
| 4,380,088 A | 4/1983 | Lipcon | 455/80 |
| 4,632,630 A | 12/1986 | Maki et al. | |
| 5,268,900 A * | 12/1993 | Hluchyj et al. | 370/412 |
| 5,319,641 A * | 6/1994 | Fridrich et al. | 370/447 |
| 5,353,287 A * | 10/1994 | Kuddes et al. | 370/448 |
| 5,436,903 A | 7/1995 | Yang et al. | |
| 5,444,705 A | 8/1995 | Olnowich et al. | |
| 5,455,841 A | 10/1995 | Hazu | 375/240 |
| 5,541,912 A * | 7/1996 | Choudhury et al. | 370/412 |
| 5,553,072 A * | 9/1996 | Daggett et al. | 370/447 |
| 5,809,021 A * | 9/1998 | Diaz et al. | 370/364 |
| 5,822,538 A | 10/1998 | Krishna et al. | |
| 5,852,723 A | 12/1998 | Kalkunte et al. | |
| 5,974,465 A | 10/1999 | Wong | |
| 6,034,957 A | 3/2000 | Haddock et al. | |
| 6,067,301 A * | 5/2000 | Aatresh | 370/418 |
| 6,078,591 A * | 6/2000 | Kalkunte et al. | 370/448 |
| 6,098,103 A | 8/2000 | Dreyer et al. | |
| 6,118,787 A | 9/2000 | Kalkunte et al. | |
| 6,141,322 A | 10/2000 | Poretsky | |
| 6,141,355 A | 10/2000 | Palmer et al. | |
| 6,172,984 B1 | 1/2001 | Beyda et al. | 370/448 |
| 6,172,990 B1 | 1/2001 | Deb et al. | |
| 6,192,028 B1 * | 2/2001 | Simmons et al. | 370/229 |

(Continued)

FOREIGN PATENT DOCUMENTS

EP  EP0917316 A2  5/1999

OTHER PUBLICATIONS

Fred Halsall, "Data Communications, Computer Networks and Open System", 3rd Edition, Addison Wesley, 1992, pp. 260-262.

*Primary Examiner* — Warner Wong

(57) ABSTRACT

A method comprises terminating transmission of a first frame having a first class of service when a transmission failure is detected, incrementing an attempt count for the first class of service, transmitting a second frame having a second class of service before retransmitting the first frame if the second class of service is higher than the first class of service, and discarding pending frames for the first class of service when at least one of the attempt count exceeds a predetermined attempt threshold and the first class of service falls below a predetermined discard threshold.

19 Claims, 9 Drawing Sheets

U.S. PATENT DOCUMENTS

| | | |
|---|---|---|
| 6,256,306 B1 | 7/2001 | Bellenger |
| 6,594,240 B1 | 7/2003 | Chuah et al. |
| 6,680,933 B1 | 1/2004 | Cheesman et al. |
| 6,725,270 B1 * | 4/2004 | Yu et al. ......................... 709/229 |
| 6,741,559 B1 | 5/2004 | Smeulders et al. ........... 370/230 |
| 6,917,623 B1 | 7/2005 | Acharya et al. |
| 6,934,297 B1 | 8/2005 | Bensaou et al. .............. 370/445 |
| 7,002,980 B1 * | 2/2006 | Brewer et al. ................. 370/414 |
| 7,027,462 B2 * | 4/2006 | Benveniste .................... 370/447 |
| 7,051,226 B1 * | 5/2006 | Lowe et al. .................... 713/500 |
| 7,106,731 B1 * | 9/2006 | Lin et al. ........................ 370/389 |
| 7,260,081 B2 * | 8/2007 | Lee et al. ....................... 370/348 |
| 7,283,470 B1 * | 10/2007 | Sindhu et al. ................. 370/230 |
| 7,787,458 B2 * | 8/2010 | Dubuc et al. .................. 370/392 |
| 7,864,674 B2 * | 1/2011 | Benveniste .................... 370/230 |
| 2001/0036181 A1 | 11/2001 | Rogers |
| 2002/0085582 A1 | 7/2002 | Kim ................................ 370/445 |
| 2003/0103517 A1 | 6/2003 | Saxena .......................... 370/432 |
| 2003/0112814 A1 * | 6/2003 | Modali et al. ................. 370/412 |
| 2004/0066743 A1 | 4/2004 | Shimojo et al. ............... 370/229 |

\* cited by examiner

QUALITY OF SERVICE HALF-DUPLEX MEDIA ACCESS CONTROLLER

CROSS-REFERENCE TO RELATED APPLICATIONS

This application is a continuation of U.S. patent application Ser. No. 10/054,595 filed on Jan. 22, 2002. The disclosure of the above application is incorporated herein by reference.

BACKGROUND

The present invention relates generally to data communications, and particularly to implementing multiple classes of service within a half-duplex Ethernet media access controller with multiple priority-based output buffers.

Ethernet is getting into the home in a big way. Consumers are increasingly taking advantage of the availability of broadband Internet access to the home. This broadband access generally takes the form of digital subscriber line (DSL) or a coaxial cable link that connects to a local area network (LAN) within the home through a DSL or cable modem. All cable and DSL modems terminate their LAN connection with a 10/100BASE-T Ethernet link. Historically this link serviced one computer. However, the current residential trend is toward multiple computers sharing the link. One solution is to connect the computers to the DSL or cable modem using a half-duplex hub.

Home gateways have started to address these issues by initially adding repeaters and now switches along with firewall and router support in a single unit. The next issue to be addressed by these units is quality of service (QoS), also referred to as "classes of service." The class of service capability defined by the IEEE 802.1 standard divides network traffic into several classes of service based on sensitivity to transfer latency, and prioritizes these classes of service. The highest class of service is usually devoted to network control traffic, such as switch-to-switch configuration messages. The remaining classes are usually devoted to user traffic. The two highest user traffic classes of service are reserved for streaming audio and streaming video. Because the ear is more sensitive to missing data than the eye, the highest of the user traffic classes of service is reserved for streaming audio. The remaining lower classes of service are reserved for traffic that is less sensitive to transfer latency, such as electronic mail and file transfers.

However, current QoS implementations do not work on half-duplex links. A network is a collection of nodes interconnected by links. Each link may be full-duplex or half-duplex. Whether a link is full-duplex or half-duplex is determined by the physical layers of the nodes connected by the link. The physical layers attempt to auto-negotiate with each other to determine whether the link is to be full-duplex or half-duplex. If either of the nodes is unable to auto-negotiate, or if one of nodes is a repeater, the link becomes half-duplex, and so cannot support simultaneous two-way traffic.

FIG. 1 shows a conventional implementation 100 of a home network with broadband access. A network 102 such as the Internet is connected by a broadband link to a modem 104. Modem 104 is connected by an Ethernet link to a terminal 114 of a port 108A of a conventional switch 106. Port 108B of switch 106 is connected by a terminal 116 to a repeater 110A that serves two personal computers 112A and 112B. Port 108C of switch 106 is connected to a repeater 110B that can serve additional computers. Repeaters 110 cannot auto-negotiate. Therefore the links connecting computers 112 to switch 106 must be half-duplex.

FIG. 2 shows a portion of a conventional half-duplex switch 206 that can act as switch 106 in the home network 100 of FIG. 1. Each port 205 is connected to a channel such as the broadband links of FIG. 1. These channels can include fiber optic links, wireline links, wireless links, and the like. Ports 205A and 205B communicate with each other through a switch controller 202 and a memory 204. Each port includes a media access controller (MAC) 206. MAC 206A includes a receiver 210A, a transmitter 212A, and a MAC controller 208A. Receiver 210A receives data arriving at terminal 214A, and places the data in memory 204 according to control signals asserted by switch controller 202. Transmitter 212A retrieves data from memory 204 according to control signals asserted by switch controller 202 and transmits the data at terminal 214B. MAC 206A includes a receiver 210B, a transmitter 212B, and a MAC controller 208B. Receiver 210B receives data arriving at terminal 216A, and places the data in memory 204 according to control signals asserted by switch controller 202. Transmitter 212B retrieves data from memory 204 according to control signals asserted by switch controller 202 and transmits the data at terminal 216B.

FIG. 3 shows a simplified version of a transmit process 300 of switch 206 according to the IEEE 802.1 standard. A frame of data received on some port 205 of switch 206 is stored in memory 204. After switch controller 202 determines the port 205 from which the frame should be transmitted, the frame is ready for transmission. When a MAC controller 208 is ready to transmit a frame, switch controller 202 assembles a frame that is ready for transmission (step 302) by moving the pointer to the frame into the MAC 206. MAC controller 208 includes an attempt counter that counts the number of transmission attempts for the current frame. When a new frame is assembled for a MAC 206, the MAC controller 208 resets the attempt counter to zero (step 304).

Transmitter 212 then waits until its channel is not busy (step 306). Transmitter 212 then waits the interframe gap (step 308) before starting transmission of the frame (step 310). Transmitter 212 monitors the channel for collisions during transmission of the frame (step 312). If the transmission is completed without collision (step 314), MAC controller 208 asserts a "completed" signal, causing switch controller 202 to assemble a new frame (step 302). However, if a collision is detected, transmitter 212 terminates the transmission (step 316) and sends a jam signal (step 318) to ensure that the other MAC involved in the collision detects the collision.

When a transmitter 212 detects a collision, MAC controller 208 increments the attempt counter (step 320). If the count maintained by the attempt counter exceeds a predetermined attempt threshold (step 322), the transmission is deemed unsuccessful, the frame is discarded, and a new frame is assembled (step 302). However, if the attempt threshold has not been exceeded, MAC controller 208 computes a back-off period (step 326) and waits until the back-off period has elapsed before attempting to transmit the frame again (step 328).

Current QoS implementations that implement process 300 cannot function on half-duplex links for the following reason. Current QoS implementations can cause high-priority traffic to be delayed by low-priority traffic on a half-duplex link. The IEEE 802.1 standard requires the transmission of a packet be completed before transmitting the next packet. When the transmission of a low-priority packet is delayed by multiple collisions, any higher-priority packets behind the low-priority packet in the queue must wait until the collisions clear and the transmission of the low-priority packet is completed. The back-off algorithm can cause this delay to be as much as 7000 packet times.

SUMMARY

In general, in one aspect, the invention features a computer program product, apparatus, and method for communicating on a half-duplex channel. It includes transmitting a first frame; terminating transmission of the first frame when a collision is detected during the transmission; and transmitting a second frame before retransmitting the first frame when the second frame has a higher class of service than the first frame.

Particular implementations can include one or more of the following features. Implementations can include sending a jam signal before transmitting the second frame. Implementations can include, after terminating the transmission, incrementing an attempt count; and discarding the first frame when the attempt count exceeds a predetermined attempt threshold. Each class of service has a predetermined attempt threshold, and implementations can include, after terminating the transmission, incrementing an attempt count; and discarding the first frame when the attempt count exceeds the predetermined attempt threshold for the class of service of the first frame. Implementations can include, after terminating the transmission, incrementing the attempt count; and discarding the first frame when the attempt count exceeds a predetermined attempt threshold and the class of service of the first frame falls below a predetermined discard threshold.

Implementations can include computing a back-off period after terminating the transmission when no frame ready for transmission has a higher class of service than the first frame; and retransmitting the first frame when the back-off period has elapsed. Computing the back-off period includes computing the back-off period as a function of the class of service of the first frame. Each class of service has an attempt count, and implementations can include, after terminating the transmission, incrementing the attempt count for the class of service of the first frame and for any other class of service that is not greater than the class of service of the first frame and for which a frame is pending transmission; and discarding all pending frames having an attempt count that exceeds a predetermined attempt threshold.

Implementations can include, before transmitting the second frame, transmitting a pending frame having a highest class of service that is less than the class of service of the first frame if the first frame was discarded. Each class of service has an attempt count and a predetermined attempt threshold, and implementations can include, after terminating the transmission, incrementing the attempt count for the class of service of the first frame and for any other class of service that is not greater than the class of service of the first frame and for which a frame is pending transmission; and discarding each pending frame when the attempt count for that frame exceeds the predetermined attempt threshold for the class of service for that frame. Each class of service has an attempt count, and implementations can include, after terminating the transmission, incrementing the attempt count for the class of service of the first frame and for any other class of service that is not greater than the class of service of the first frame and for which a frame is pending transmission; and discarding a given pending frame having an attempt count that exceeds a predetermined attempt threshold when the class of service of the given pending frame falls below a predetermined discard threshold.

Implementations can include computing a back-off period after terminating the transmission when no frame ready for transmission has a higher class of service than the first frame; and retransmitting the first frame when the back-off period has elapsed. Computing the back-off period includes computing the back-off period as a function of the class of service of the first frame.

In general, in one aspect, the invention features a network switch that includes a first port in communication with a first half-duplex channel; a second port in communication with a second half-duplex channel; a memory; wherein the first port communicates with the second port via the memory; wherein the first port includes a first transmitter to transmit data over the first half-duplex channel; a first controller to terminate the first transmitter from transmitting a first frame of the data when a collision is detected during the transmission and to determine a class of service for each frame; and wherein the first transmitter transmits a second frame of the data before retransmitting the first frame when the second frame has a higher class of service than the first frame; and wherein the second port includes a second transmitter to transmit data over the second half-duplex channel; a second controller to terminate the second transmitter from transmitting a third frame of the data when a collision is detected during the transmission and to determine a class of service for each frame; and wherein the second transmitter transmits a fourth frame of the data before retransmitting the third frame when the fourth frame has a higher class of service than the third frame.

The details of one or more implementations are set forth in the accompanying drawings and the description below. Other features will be apparent from the description and drawings, and from the claims.

Figure 1:
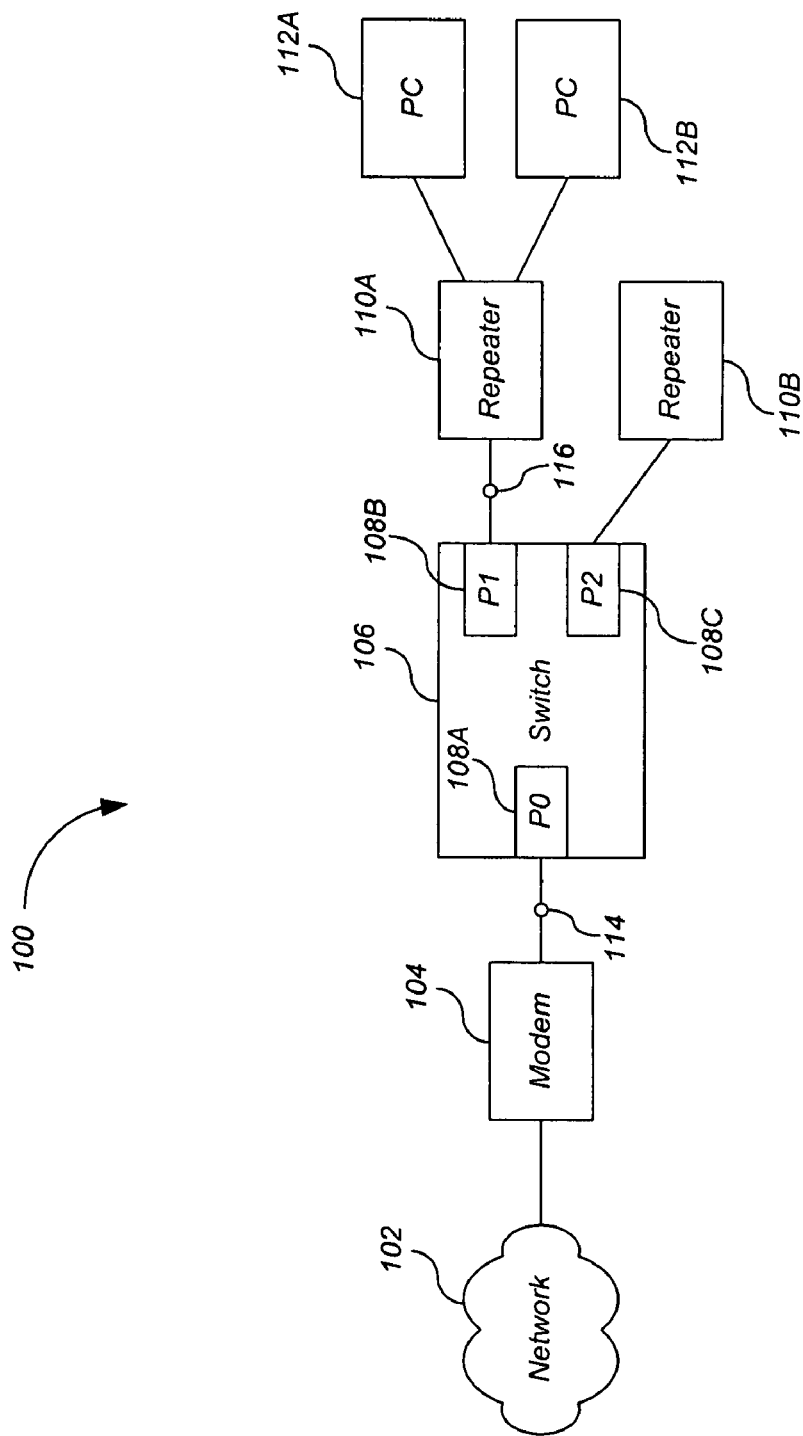
FIG. 1 shows a conventional implementation of a home network with broadband access.
Figure 2:
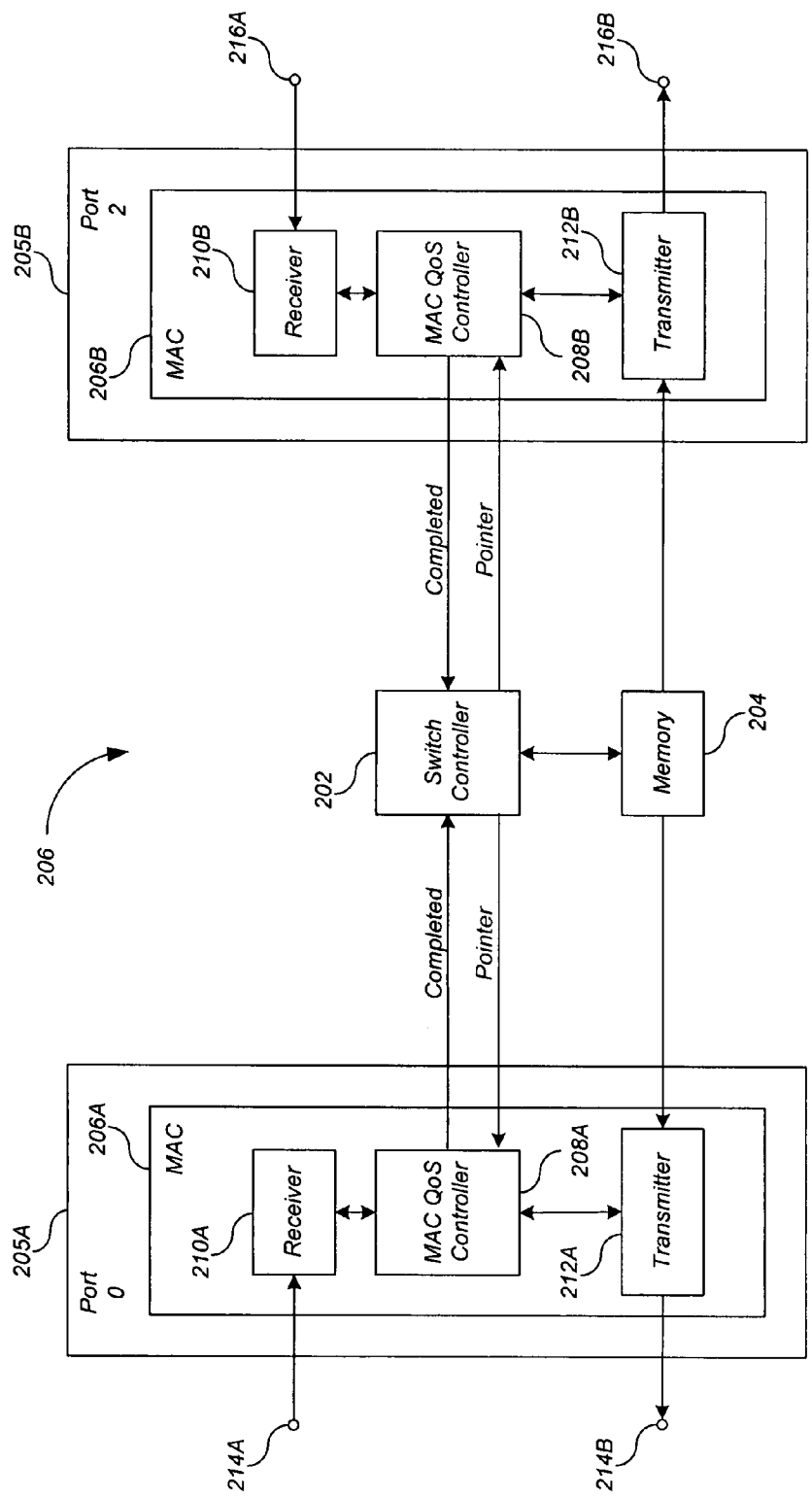
FIG. 2 shows a portion of a conventional half-duplex switch that can act as switch 106 in the home network of FIG. 1.
Figure 3:
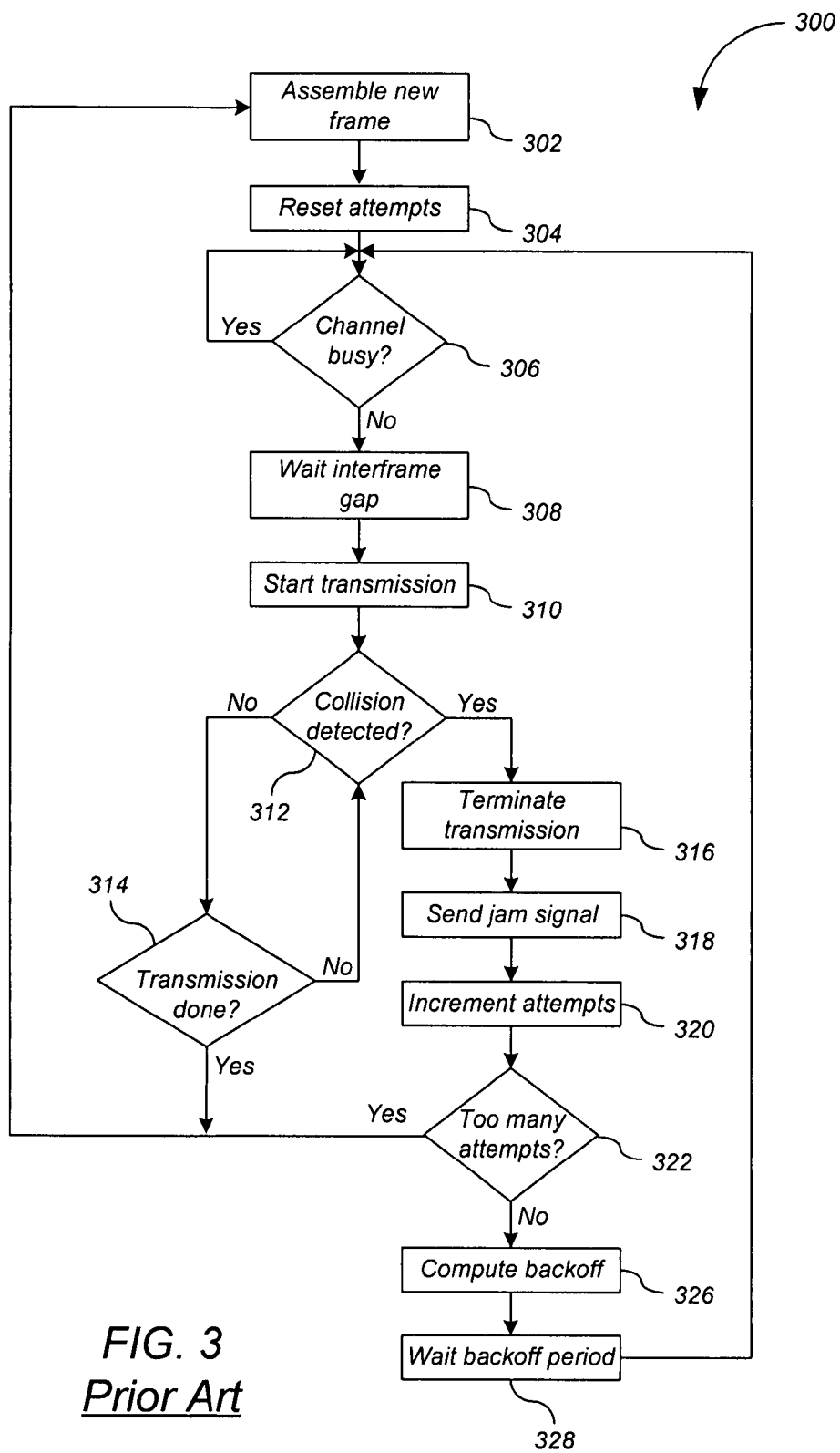
FIG. 3 shows a simplified version of a transmit process of the switch of FIG. 2 according to the IEEE 802.1 standard.

The leading digit(s) of each reference numeral used in this specification indicates the number of the figure in which the reference numeral first appears.

DETAILED DESCRIPTION

Figure 4:
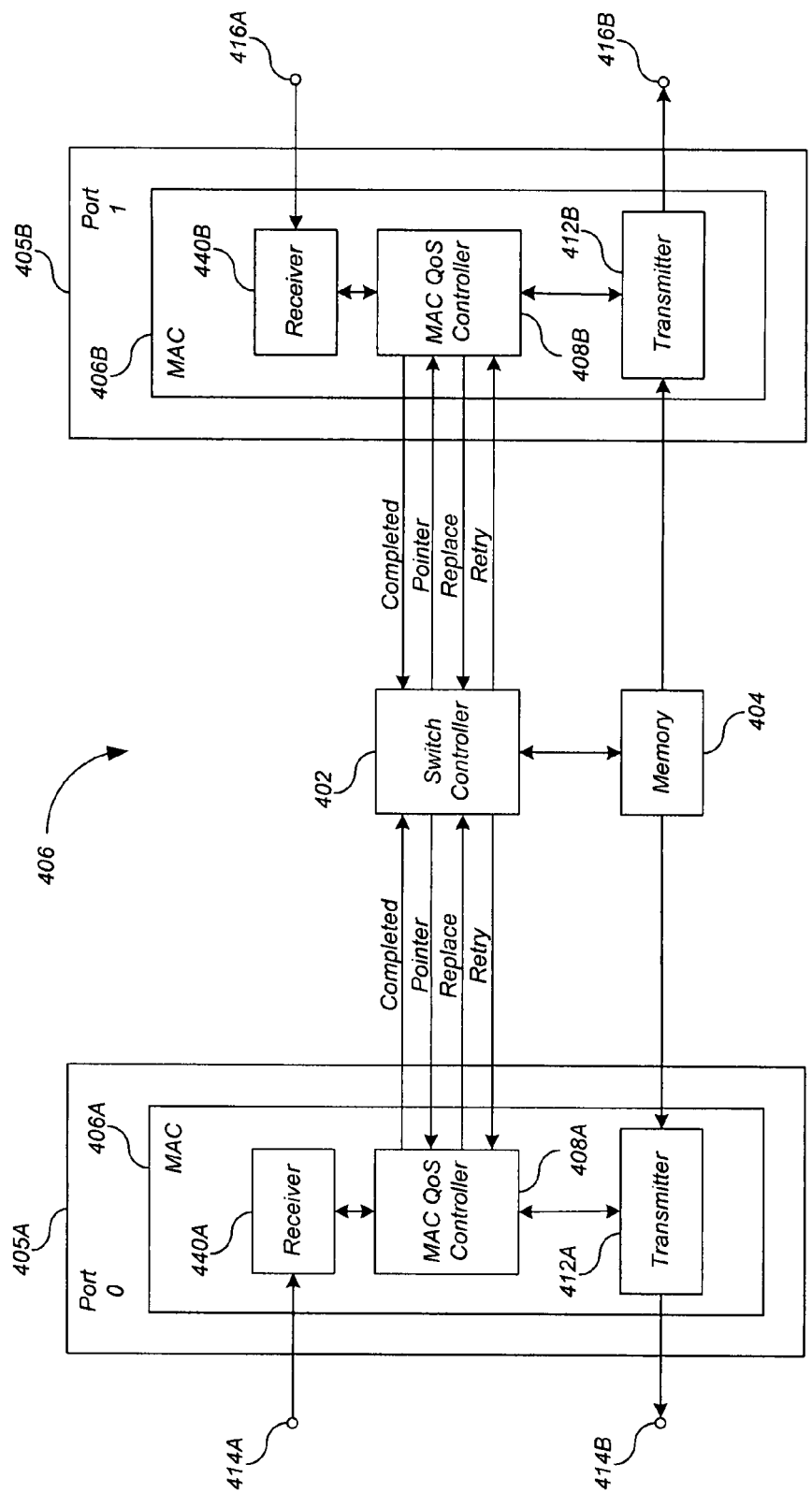
FIG. 4 shows a portion of a half-duplex network switch according to one implementation.

FIG. 4 shows a portion of a half-duplex network switch 406 according to one implementation. Switch 406 can replace switch 106 in the home network 100 of FIG. 1. Ports 405A and 405B communicate with each other through a switch controller 402 and a memory 404. Each port includes a MAC 406. MAC 406A includes a receiver 410A, a transmitter 412A, and a MAC Quality of Service (QoS) controller 408A. Receiver 410A receives data arriving at terminal 414A, and places the data in memory 404 according to control signals asserted by switch controller 402. Transmitter 412A retrieves data from memory 404 according to control signals asserted by switch controller 402 and transmits the data at terminal 414B. MAC 406A includes a receiver 410B, a transmitter 412B, and a MAC QoS controller 408B. Receiver 410B receives data arriving at terminal 416A, and places the data in memory 404 according to control signals asserted by switch controller 402. Transmitter 412B retrieves data from memory 404 according to control signals asserted by switch controller 402 and transmits the data at terminal 416B. Each of receivers 410, transmitters 412, MAC QoS controllers 408, and switch controller 402 can be implemented using hardware, software, or any combination thereof. In one implementation, MAC QoS controller 408 is a state machine.

Figure 5A:
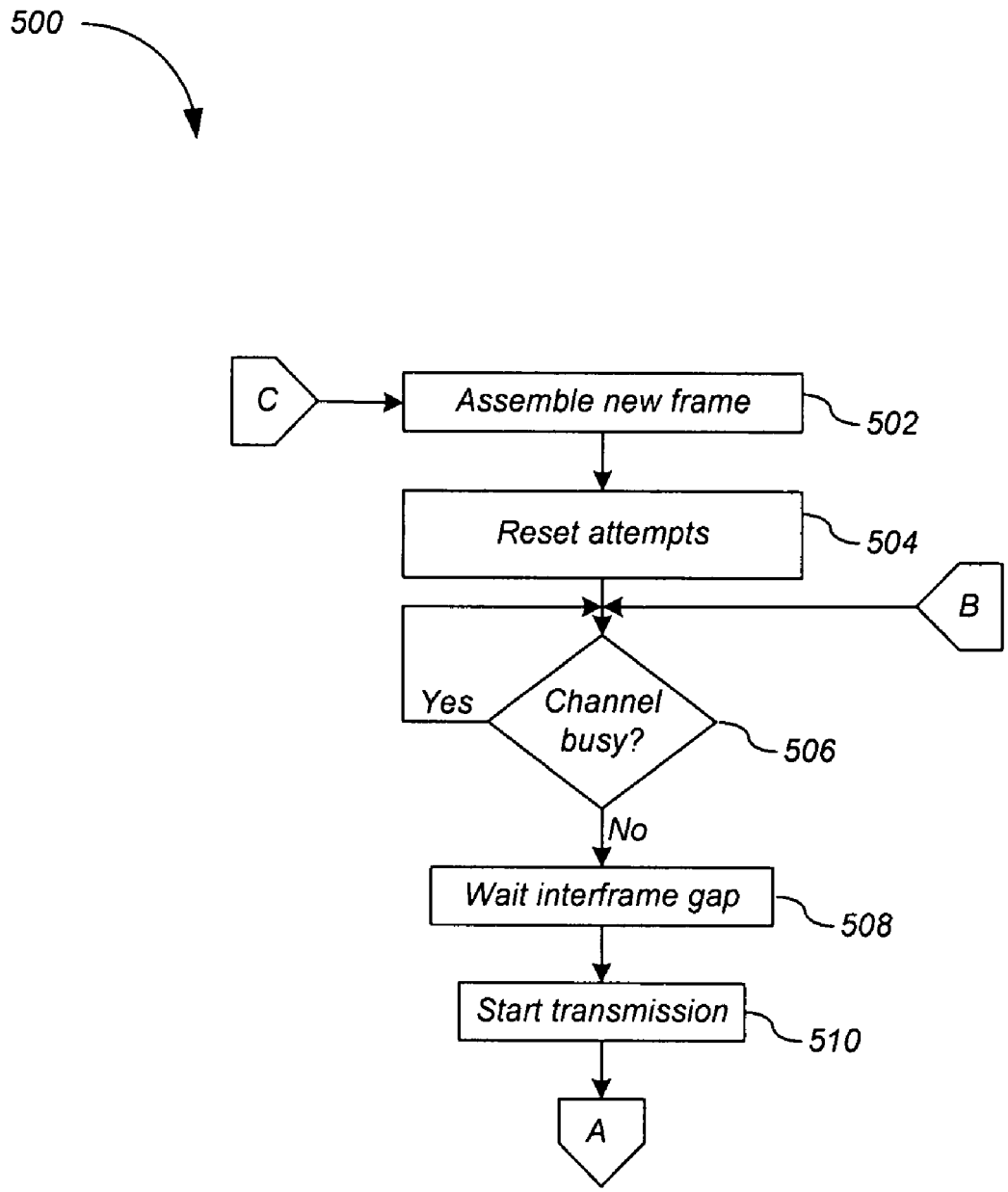
FIGS. 5A and 5B show a transmit process of the switch of FIG. 4 according to one implementation.
Figure 5B:
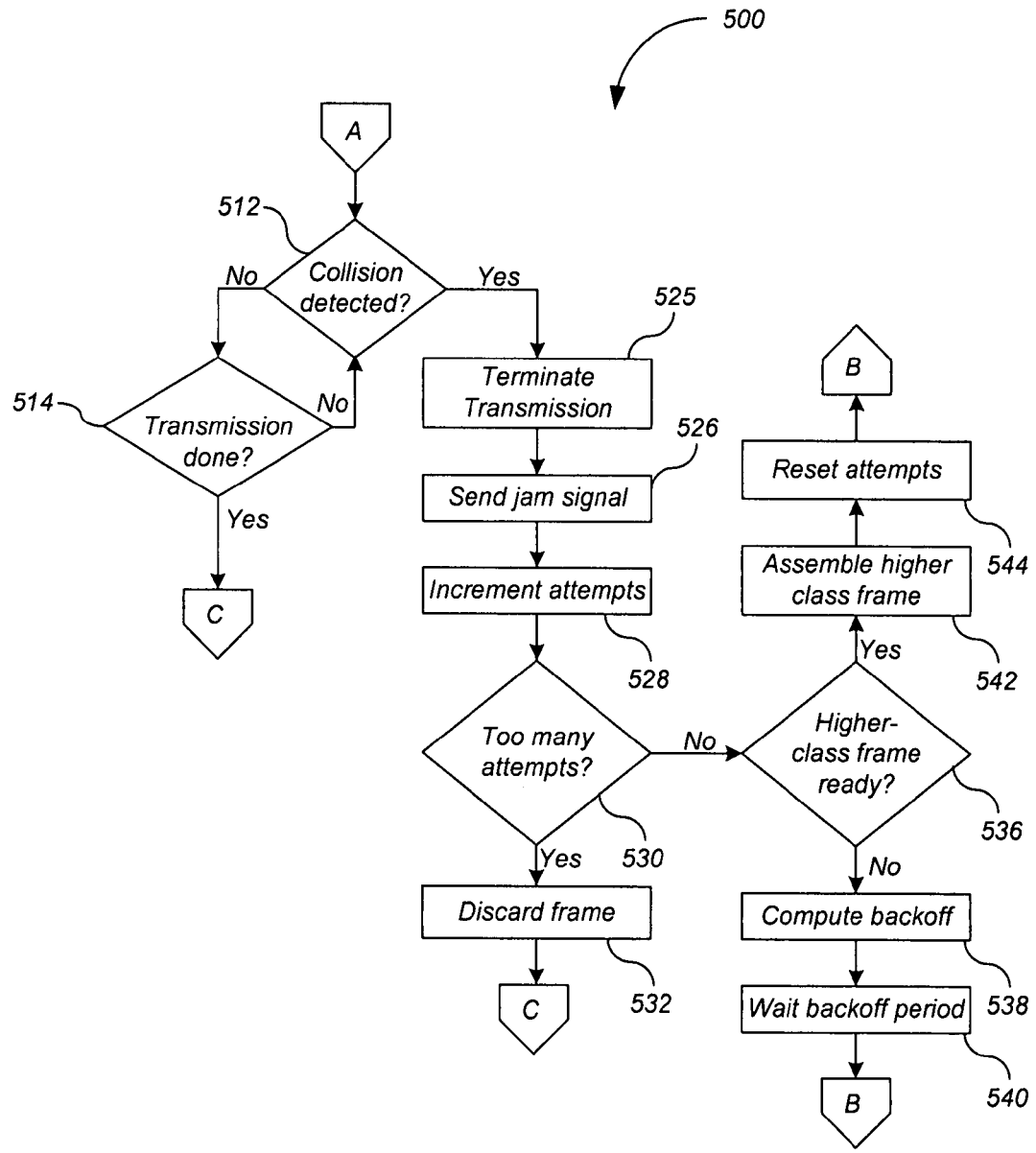

FIGS. 5A and 5B show a transmit process 500 of switch 406 according to one implementation. A frame of data received on some port 405 of switch 406 is stored in memory 404. After switch controller 402 determines the port 405 from which the frame should be transmitted, the frame is ready for transmission. In one implementation, memory 404 is segmented into different portions or queues for each port 405. When a MAC QoS controller 408 is ready to transmit a frame, switch controller 402 assembles a frame that is ready for transmission (step 502) by moving the pointer to the frame into the MAC 406. MAC QoS controller 408 includes an attempt counter that counts the number of transmission attempts for the current frame. When a new frame is assembled for a MAC 406, the MAC QoS controller 408 resets the attempt counter to zero (step 504).

Transmitter 412 then waits until its channel is not busy (step 506). Transmitter 412 then waits the interframe gap (step 508) before starting transmission of the frame (step 510). Transmitter 412 monitors the channel for collisions during transmission of the frame (step 512). If the transmission is completed without collision (step 514), MAC QoS controller 408 asserts a "completed" signal, causing switch controller 402 to assemble a new frame (step 502). However, if a collision is detected, transmitter 412 terminates the transmission (step 525) and sends a jam signal (step 526) to ensure that the other MAC involved in the collision detects the collision.

When a transmitter 412 detects a collision, MAC QoS controller 408 increments the attempt counter (step 528). If the count maintained by the attempt counter exceeds a predetermined attempt threshold (step 530), the transmission is deemed unsuccessful, the frame is discarded (step 532), and a new frame is assembled (step 502). In one implementation, the attempt threshold is the same for all classes of service. In another implementation, each class of service has a predetermined attempt threshold. In that implementation, a frame is discarded when the attempt count exceeds the attempt threshold for the class of service of that frame. In another implementation, each class of service has a predetermined attempt threshold, and a predetermined discard threshold is implemented. In that implementation, a frame is discarded only when the attempt count exceeds the attempt threshold for the class of service of that frame and the class of service of that frame falls below the discard threshold.

If the attempt threshold has not been exceeded (step 530), MAC QoS controller 408 causes switch controller 402 to determine whether a frame having a higher class of service than the collision frame (that is, the frame that just suffered a collision) is ready for transmission (step 536). In one implementation, MAC QoS controller 408 causes this by sending a "replace" signal to switch controller 402. If no higher-class frame is ready, switch controller 402 asserts a "retry" signal that causes MAC QoS controller 408 to compute a back-off period (step 538) and wait until the back-off period has elapsed (step 540) before attempting to transmit the collision frame again (resuming at step 506). In one implementation, the back-off period for a frame is computed as specified by IEEE standard 802.3. According to that standard, the back-off period is chosen as a number of slot times r where r is a uniformly-distributed random integer in the range:

$$0 \leq r < 2^k$$

where $$k = \min(n, m) \quad (2)$$

where n is the attempt count and m=10. In another implementation, the back-off period for a collision frame is computed as a function of the class of service of the collision frame. For example, the range in equation (1) can be limited by computing range limit m as a function of the class of service. For example, one could set $$m = \text{maxQoS}(\text{priority}) \quad (3)$$

where maxQoS is the class of service of the collision frame (e.g., 4) and priority is the maximum back-off limit for the class of service of the collision frame.

If a higher-class frame is ready, then switch controller 402 assembles the higher-class frame (step 542), which causes MAC QoS controller 408 to reset the attempt counter (step 544), and to attempt to transmit the higher-class frame (resuming at step 506). In one implementation, MAC QoS controller 408 computes a back-off period, and waits until the back-off period has elapsed, before attempting to transmit the higher-class frame. The attempt count n is reset before computing this back-off period. In one such implementation, the back-off period is computed as a function of the class of service of the higher-class frame.

Figure 6:
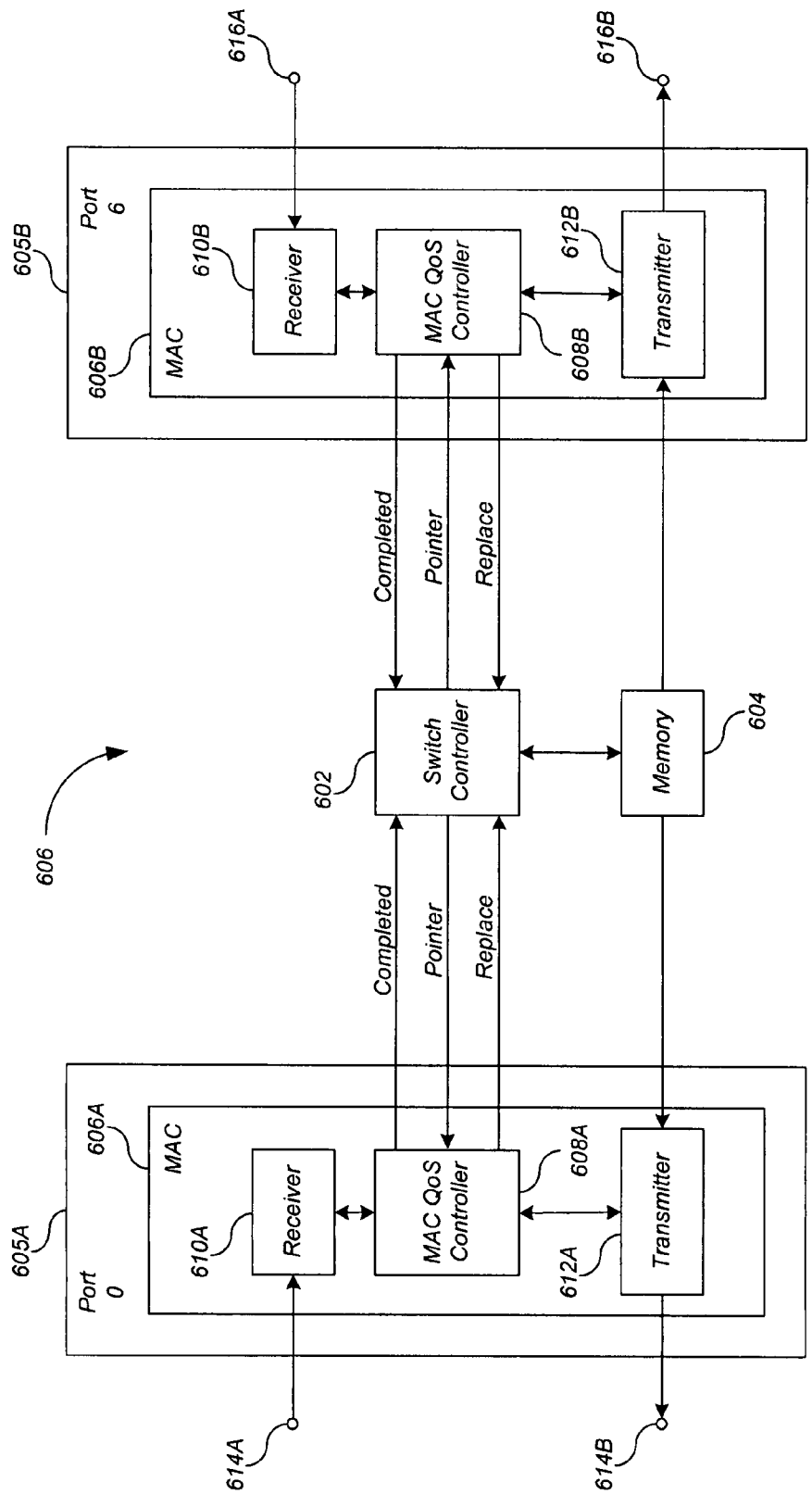
FIG. 6 shows a portion of a half-duplex network switch according to one implementation.

FIG. 6 shows a portion of a half-duplex network switch 606 according to one implementation. Switch 606 can replace switch 106 in the home network 100 of FIG. 1. Ports 605A and 605B communicate with each other through a switch controller 602 and a memory 604. Each port includes a MAC 606. MAC 606A includes a receiver 610A, a transmitter 612A, and a MAC QoS controller 608A. Receiver 610A receives data arriving at terminal 614A, and places the data in memory 604 according to control signals asserted by switch controller 602. Transmitter 612A retrieves data from memory 604 according to control signals asserted by switch controller 602 and transmits the data at terminal 614B. MAC 606A includes a receiver 610B, a transmitter 612B, and a MAC QoS controller 608B. Receiver 610B receives data arriving at terminal 616A, and places the data in memory 604 according to control signals asserted by switch controller 602. Transmitter 612B retrieves data from memory 604 according to control signals asserted by switch controller 602 and transmits the data at terminal 616B. Each of receivers 610, transmitters 612, MAC QoS controllers 608, and switch controller 602 can be implemented using hardware, software, or any combination thereof. In one implementation, MAC QoS controller 608 is a state machine.

Figure 7A:
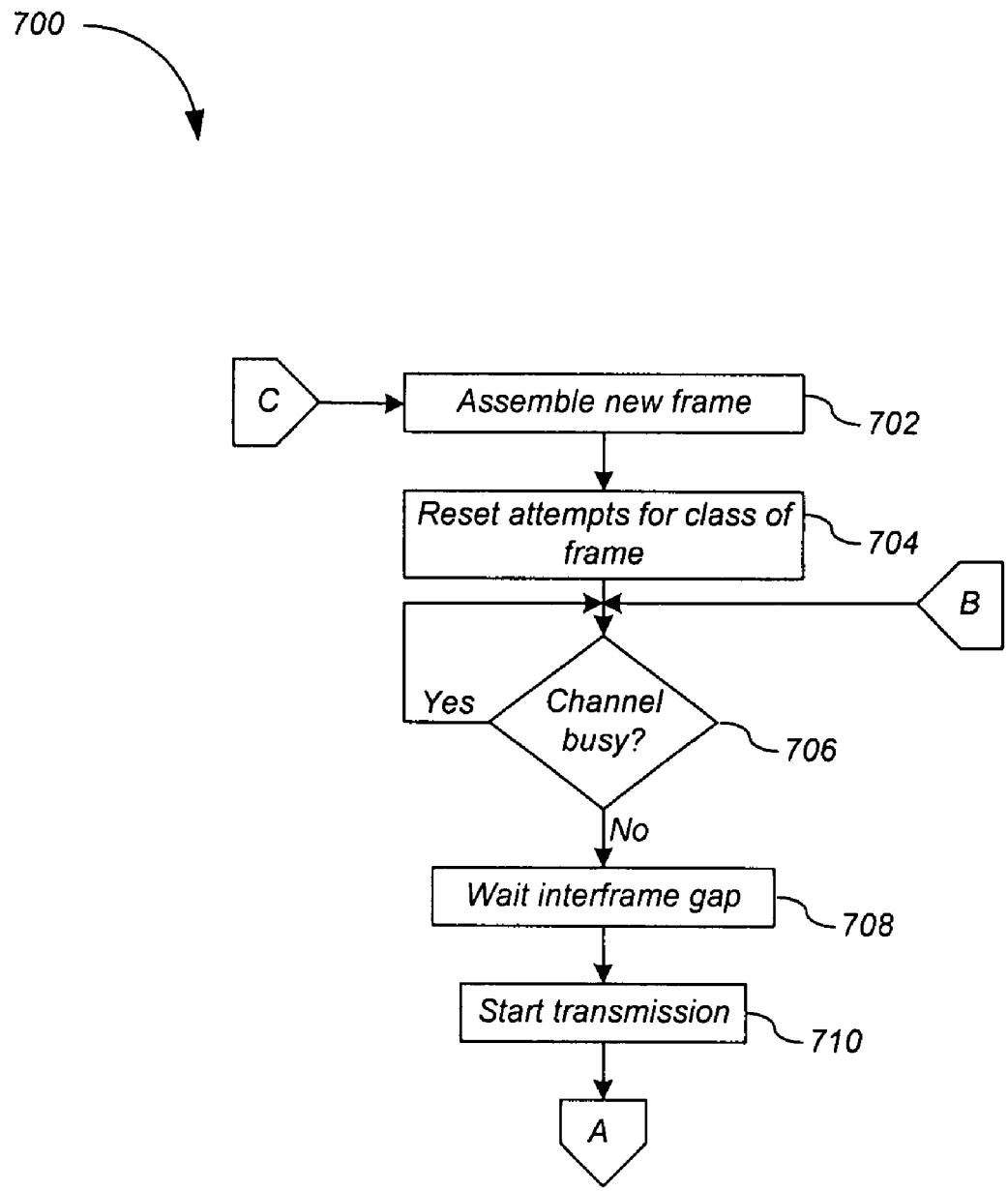
FIGS. 7A and 7B show a transmit process of the switch of FIG. 6 according to one implementation.
Figure 7B:
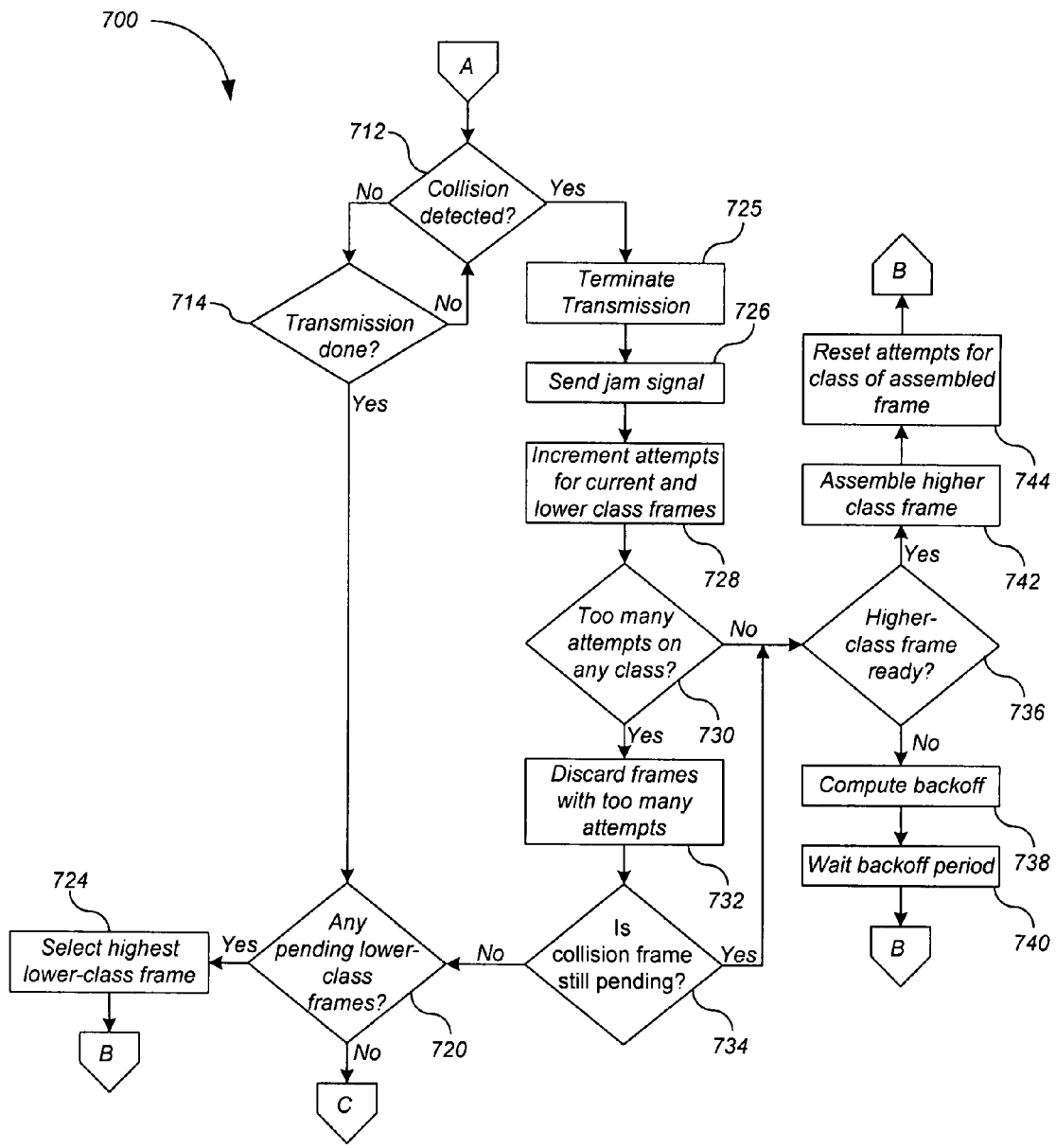

FIGS. 7A and 7B show a transmit process 700 of switch 606 according to one implementation. A frame of data received on some port 605 of switch 606 is stored in memory 604. After switch controller 602 determines the port 605 from which the frame should be transmitted, the frame is ready for transmission. In one implementation, memory 604 is segmented into different portions or queues for each port 605.

When a MAC QoS controller 608 is ready to transmit a frame, switch controller 602 assembles a frame that is ready for transmission (step 702) by moving the pointer to the frame into the MAC 606. MAC QoS controller 608 includes an attempt counter for each class of service. Each attempt counter counts the number of transmission attempts for pending frames in one of the classes of service. A frame is considered to be "pending" in a MAC 606 after it has been assembled, but before it has been successfully transmitted or discarded. When a new frame is assembled for a MAC 606, the MAC QoS controller 608 resets to zero the attempt counter for the class of service of the new frame (step 704).

Transmitter 612 then waits until its channel is not busy (step 706). Transmitter 612 then waits the interframe gap (step 708) before starting transmission of the frame (step 710). Transmitter 612 monitors the channel for collisions during transmission of the frame (step 712). If the transmission is completed without collision (step 714), MAC QoS controller 608 determines whether any frames are pending that have a lower class of service than the frame just transmitted (step 720). Conditions that would cause a lower-class frame to be pending include a collision during transmission of the lower-class frame that caused the lower-class frame to be superseded by a frame of a higher class of service, as described below.

If no lower-class frames are pending, MAC QoS controller 608 asserts a "completed" signal, causing switch controller 602 to assemble a new frame (step 702). However, if lower-class frames are pending, MAC QoS controller 608 selects the pending lower-class frame having the highest class of service (step 724), and attempts to transmit the selected frame (resuming at step 706).

If a collision is detected during transmission of a frame (step 712), transmitter 612 terminates the transmission (step 725) and sends a jam signal (step 726) to ensure that the other MAC involved in the collision detects the collision. MAC QoS controller 608 then increments the attempt counter for the class of service of the collision frame, and increments the attempt counters for all classes of service lower than the class of service of the collision frame (step 728). If the count maintained by any attempt counter exceeds a predetermined attempt threshold (step 730), the pending frames of the classes of service of those attempt counters are discarded (step 732).

In one implementation, the attempt threshold is the same for all classes of service. In another implementation, each class of service has a predetermined attempt threshold. In that implementation, a frame is discarded when the attempt count exceeds the attempt threshold for the class of service of that frame. In another implementation, each class of service has a predetermined attempt threshold, and a predetermined discard threshold is implemented. In that implementation, a frame is discarded only when the attempt count exceeds the attempt threshold for the class of service of that frame and the class of service of that frame falls below the discard threshold.

If the collision frame is no longer pending (for example, because the current collision caused the attempt counter for the class of service of the collision frame to exceed the attempt threshold), MAC QoS controller 608 determines whether any frames are pending that have a lower class of service than the collision frame (step 720). If no lower-class frames are pending, MAC QoS controller 608 asserts a "completed" signal, causing switch controller 602 to assemble a new frame (step 702). However, if lower-class frames are pending, MAC QoS controller 608 selects the pending lower-class frame having the highest class of service (step 724), and attempts to transmit the selected frame (resuming at step 706).

If the collision frame is still pending (step 734), or if none of the attempt counters have exceeded the attempt threshold (step 730), MAC QoS controller 608 causes switch controller 602 to determine whether a frame having a higher class of service than the collision frame is ready for transmission (step 736). In one implementation, this is accomplished as follows. MAC QoS controller 608 sends a "replace" signal to switch controller 602. The "replace" signal indicates the class of service of the collision frame. Switch controller 602 continually determines which of the frames ready for transmission by each MAC 606 has the highest class of service for that MAC 606. In response to the "replace" signal, switch controller 602 determines whether the frame ready for transmission by the MAC 606 asserting the "replace" signal has a higher class of service than the collision frame.

If a higher-class frame is ready, then switch controller 602 assembles the higher-class frame (step 742), which causes MAC QoS controller 608 to reset the attempt counter for the class of service of that higher-class frame (step 744), and to attempt to transmit that frame (resuming at step 706). In one implementation, MAC QoS controller 608 computes a back-off period, and waits until the back-off period has elapsed, before attempting to transmit the higher-class frame. The attempt count n is reset before computing this back-off period. In one such implementation, the back-off period is computed as a function of the class of service of the higher-class frame.

However, if no higher-class frame is ready, MAC QoS controller 608 computes a back-off period (step 738) and waits until the back-off period has elapsed (step 740) before attempting to transmit the collision frame again (resuming at step 706). In one implementation, the back-off period for a frame is computed as specified by IEEE standard 802.3. In another implementation, the back-off period for a collision frame is computed as a function of the class of service of the collision frame, as described above.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Implementations of the invention temporarily remove a "head-of-line" frame upon collision when a frame with a higher class of service is ready for transmission. In the described implementations, the attempt count n is reset before attempting to transmit the higher-class frame. In some implementations, a back-off period is computed based upon the attempt count n, and elapses before transmitting the higher-class frame. However, other methods can be used to select the value for the attempt count n and back-off period. Accordingly, other implementations are within the scope of the following claims.

What is claimed is:

1. A method, comprising:
   terminating transmission of a first frame having a first class of service when a transmit failure occurs in a transmitter;
   incrementing an attempt count for the first class of service;
   transmitting a second frame having a second class of service before retransmitting the first frame when the second class of service is higher than the first class of service; and
   discarding pending frames for the first class of service when the attempt count exceeds a predetermined attempt threshold and the first class of service falls below a predetermined discard threshold.

2. The method of claim 1, further comprising computing a back-off period after terminating the transmission when other frames that are ready for transmission have a lower class of service than the first class of service.

3. The method of claim 2, further comprising retransmitting the first frame after the back-off period.

4. The method of claim 2, wherein a length of the back-off period is based on a value of the first class of service.

5. A method, comprising:
   terminating transmission of a first frame having a first class of service when a transmit failure occurs in a transmitter;
   incrementing an attempt count for the first class of service;
   transmitting a second frame having a second class of service before retransmitting the first frame when the second class of service is higher than the first class of service;
   discarding pending frames for the first class of service when the attempt count exceeds a predetermined attempt threshold and the first class of service falls below a predetermined discard threshold; and
   before transmitting the second frame, transmitting a pending frame having a highest class of service that is less than the class of service of the first frame when the first frame was discarded.

6. A method, comprising:
   terminating transmission of a first frame having a first class of service using a transmitter when a transmit failure occurs;
   incrementing an attempt count for the first class of service when the transmit failure occurs;
   incrementing an attempt count for a second class of service that is lower than the first class of service and that has a pending frame; and
   discarding pending frames for the first class of service when the attempt count for the first class of service exceeds a predetermined attempt threshold and the first class of service falls below a first predetermined discard threshold.

7. The method of claim 6, further comprising discarding pending frames for the second class of service when at least one of the attempt count for the second class of service exceeds a second predetermined attempt threshold and the second class of service falls below a second predetermined discard threshold.

8. The method of claim 6, further comprising computing a back-off period after terminating the transmission when other frames that are ready for transmission have a lower class of service than the first class of service.

9. The method of claim 8, further comprising retransmitting the first frame after the back-off period.

10. The method of claim 8, wherein a length of the back-off period is based on a value of the first class of service.

11. A system, comprising:
    a transmitter; and
    a controller configured to:
    store attempt counts for N classes of service, wherein N is an integer greater than one,
    terminate transmission of a first frame having a first one of the N classes of service when a frame transmit failure occurs,
    selectively cause the transmitter to transmit a second frame having a second one of the N classes of service before retransmitting the first frame based on a comparison between the first one and the second one of the N classes of service,
    increment an attempt count for the first one of the N classes of service, and
    cause pending frames for the first one of the N classes of service to be discarded when the attempt count for the first one of the N classes of service exceeds a predetermined attempt threshold and the first one of the N classes of service falls below a predetermined discard threshold.

12. The system of claim 11, wherein the controller is configured to calculate a back-off period after terminating the transmission when other frames that are ready for transmission have a lower class of service than the first one of the N classes of service.

13. The system of claim 12, wherein the controller is configured to retransmit the first frame after the back-off period.

14. The system of claim 12, wherein a length of the back-off period is based on a value of the one of the N classes of service.

15. An apparatus, comprising:
    a transmitter configured to transmit data including frames, wherein each of the frames is associated with one of N classes of service, where N is an integer greater than one; and
    a controller configured to:
    selectively terminate transmission of a first frame having a first one of said N classes of service when a frame transmit failure occurs,
    cause the transmitter to transmit a second frame having a second one of the N classes of service before retransmitting the first frame when the second one of said N classes of service is greater than the first one of said N classes of service,
    increment an attempt count for the first one of the N classes of service when transmission is terminated;
    increment an attempt count for a third one of the N classes of service that is lower than the first one of the N classes of service and that has a frame pending transmission, and
    cause pending frames associated with the first one of the N classes of service to be discarded when the attempt count for the first one of said N classes of service exceeds a first attempt threshold and the first one of the N classes of service falls below a predetermined discard threshold.

16. The apparatus of claim 15, wherein the controller is configured to cause pending frames associated with the third one of the N classes of service to be discarded when the attempt count for the third one of the N classes of service exceeds another attempt threshold.

17. The apparatus of claim 15 wherein the controller is configured to calculate a back-off period after terminating the transmission when other frames ready for transmission have a lower class of service than the first one of the N classes of service.

18. The apparatus of claim 17, wherein the transmitter is configured to retransmit the first frame after the back-off period.

19. The apparatus of claim 17, wherein a length of the back-off period is calculated based on a value of the first one of the N classes of service.

* * * * *